United States Patent [19]

Rodriguez et al.

[11] Patent Number: 5,139,114
[45] Date of Patent: Aug. 18, 1992

[54] VISIBLE BRAKE BLOCK WEAR INDICATOR

[75] Inventors: Roger C. Rodriguez; Donald P. Johnson, both of Winchester, Va.

[73] Assignee: Abex Corporation

[21] Appl. No.: 670,687

[22] Filed: Mar. 18, 1991

[51] Int. Cl.$^5$ ............................................. F16D 66/02
[52] U.S. Cl. ............................. 188/1.11; 188/250 G; 192/30 W
[58] Field of Search ................... 188/1.11, 234, 250 R, 188/250 B, 250 G, 250 F, 238, 240, 241, 250 C; 116/208; 192/30 W

[56] References Cited

U.S. PATENT DOCUMENTS

| | | | |
|---|---|---|---|
| 1,949,670 | 3/1934 | Winters | 188/1.11 X |
| 3,088,549 | 5/1963 | Borsa | 188/1.11 |
| 3,440,604 | 4/1969 | Phillips | 188/1.11 X |
| 3,533,491 | 10/1970 | Svenson | 188/1.11 |
| 4,606,434 | 8/1986 | Vasilow et al. | 188/1.11 |
| 4,606,435 | 8/1986 | Johnson | 188/1.11 |
| 4,771,870 | 9/1988 | Belk | 188/250 C X |

FOREIGN PATENT DOCUMENTS

| | | | |
|---|---|---|---|
| 0174746 | 3/1986 | European Pat. Off. | 188/1.11 |
| 1905350 | 8/1970 | Fed. Rep. of Germany | 188/1.11 |
| 181921 | 10/1966 | U.S.S.R. | 188/250 G |
| 1586200 | 3/1981 | United Kingdom | 188/1.11 |

Primary Examiner—Robert J. Oberleitner
Assistant Examiner—Alfred Muratori
Attorney, Agent, or Firm—Thomas S. Baker, Jr.

[57] ABSTRACT

A brake block for automotive drum brake systems having a visible wear indicator indicating the remaining usable thickness of the brake block. The wear indicator may be molded or machined into the side of the brake block and also may indicate where the tops of the fasteners for the brake block are located when fasteners are used to affix the brake block to a backing plate.

7 Claims, 2 Drawing Sheets

VISIBLE BRAKE BLOCK WEAR INDICATOR

BACKGROUND OF THE INVENTION

Presently many large automotive vehicles such as trucks and buses utilize drum type braking systems for stopping the vehicles. The systems may be actuated hydraulically or may be actuated by a combination of pneumatics and hydraulics. These braking systems include a plurality of brake shoes each having at least one brake block of friction material mounted on a backing plate by means of rivets or by bonding. Typically a pair of brake shoes mounts on a fixture inside of the rotating hub of a vehicle wheel. During the braking operation the two brake shoes are moved radially outwardly of the fixture and into engagement with the inside surface of a brake drum which mounts on the hub and overlies the brake shoe. Friction resulting from the engagement of the outer surface of the brake blocks with the inner surface of the brake drum causes the rotation of the vehicle wheels to slow and ultimately to stop.

The frictional engagement between the brake blocks and the brake drums causes the outer surface of the brake blocks to erode or wear. Eventually the brake blocks become worn to where they are unusable. This occurs when a brake block has been worn to where only a minimum amount of friction material overlying the tops of the rivets, or adhesive composition which affix the block to the brake drum has been reached. If the brake block is permitted to remain on the vehicle after being worn to where only the minimum safe amount of friction material remains, any additional wear of the brake block will cause the rivets or bolts to become exposed and begin to scrape against the inner surface of the brake drum or cause the composition interface to scrape against the inner surface of the brake drum with a complete absence of friction material. Either of these conditions is undesirable and may result in diminished braking capability and in damage to a brake drum.

In order to check the amount of wear of a friction material brake block on a brake shoe to determine if it has been eroded to the minimum safe amount of remaining material, in the past it has been necessary to remove the wheel and brake drum from the axle of the vehicle to visually inspect the brake block. After the brake drum has been removed from the vehicle the thickness of the brake block material may be measured to determine the amount of material remaining on the brake shoe. In some instances an arcuate line may be scribed on the sides of the brake block to indicate the safe minimum thickness of the block which makes it unnecessary to measure the thickness of the block. In some instances the personnel servicing the vehicle do not measure the thickness of the brake block but rely on experience to determine if sufficient material remains to enable a brake block to be used safely. Even where the service personnel measure the thickness of the brake block manually they first must determine if the brake block is bonded or riveted onto the backing plate in order to ascertain properly the exact thickness of the usable remaining friction material on the brake block. Because of the expense, inconvenience and vehicle downtime which results when the wheels must be removed from a vehicle for inspection of the brake blocks, vehicle operators may make such inspections less often than would be required to find a brake block which has been worn out. If this occurs, the braking capacity of the vehicle may be diminished and a brake drum may be damaged.

It is desirable to provide a friction material brake block having a wear indicator means by which the thickness of the remaining material on a brake block which may be utilized safely may be observed without having to remove the wheel and the brake drum from the vehicle.

SUMMARY OF THE INVENTION

The instant invention comprises a friction material brake block having an outside radius forming a top braking surface, an inside radius forming an arcuate bottom surface adapted to be attached to a complementary shaped top surface of a backing plate, a pair of longitudinally extending side surfaces and a pair of laterally extending end surfaces which define the perimeter of said brake block and visible wear indicating means for indicating visibly the remaining usable thickness of the brake block below the top braking surface.

DESCRIPTION OF THE PREFERRED EMBODIMENT

Figure 2:
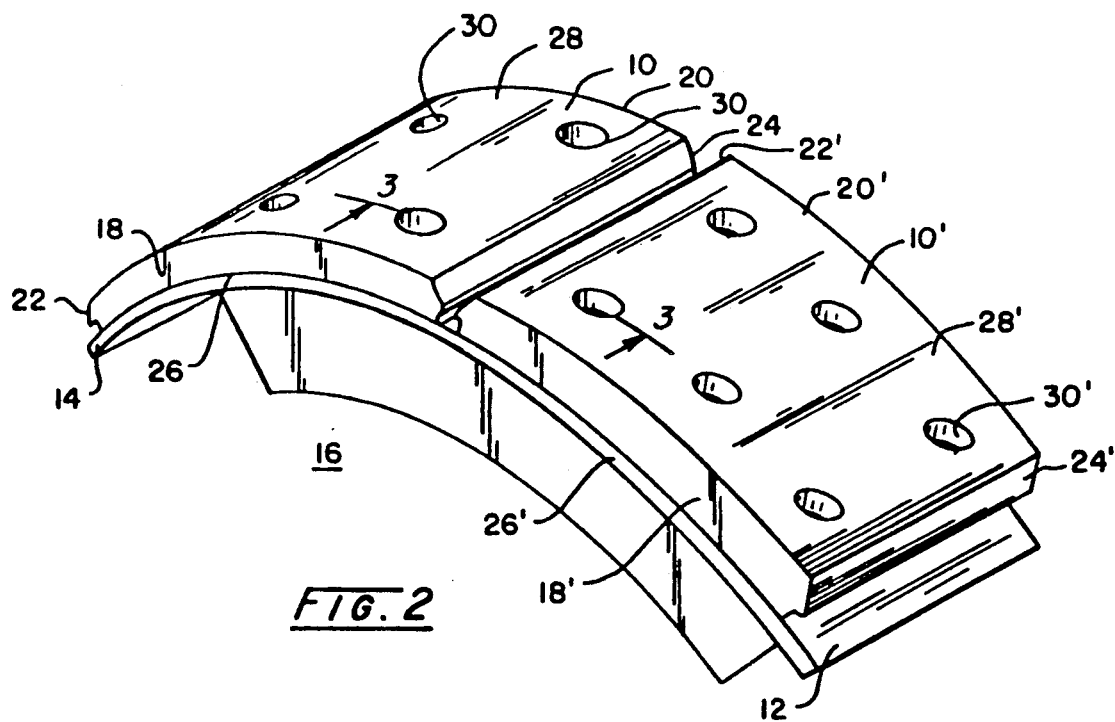
FIG. 2 is a perspective view of a pair of brake blocks having the visible wear indicating means of the present invention and mounted on a backing plate.

Turning to FIG. 2 of the drawings, a pair of substantially identical friction material brake blocks (10 and 10') are shown mounted on the top surface (12) of a metal backing plate (14). The combination of the brake blocks (10 and 10') with the backing plate (14) constitute a brake shoe (16). Inasmuch as the brake shoe (16) depicted in FIG. 2 represents the type of shoe which would be utilized in connection with a concentric braking system, the brake blocks (10 and 10') are substantially identical. For convenience, in this description the parts and features of brake block (10') which are identical to those of brake block (10) will be identified by identical prime number. It should be noted that although the present invention has been shown in connection with brake blocks (10 and 10') of the type utilized in a concentric braking system the invention implies equally to the cam and anchor shoes utilized in a cam braking system.

Again turning to FIG. 2, brake block (10) has a pair of longitudinally extending side surfaces (18 and 20) and a pair of laterally extending end surfaces (22 and 24). Brake block (10) also has an arcuate bottom surface (26) which rests upon the complementary top surface (12) of backing plate (14) and an arcuate top surface (28) adapted to engage a similarly shaped inner surface of a brake drum, not shown, when the brakes of a vehicle are actuated and the brake shoe (16) moves radially outwardly into engagement with the inner surface of the brake drum.

When brake shoe (16) has been installed in a vehicle braking system, the longitudinal side surfaces (18 and 20) extend in a direction parallel to the direction of brake drum and wheel rotation whereas the lateral end surfaces (22 and 24) extend in a direction perpendicular to the direction of rotation of a brake drum and wheel assembly.

Figure 3:
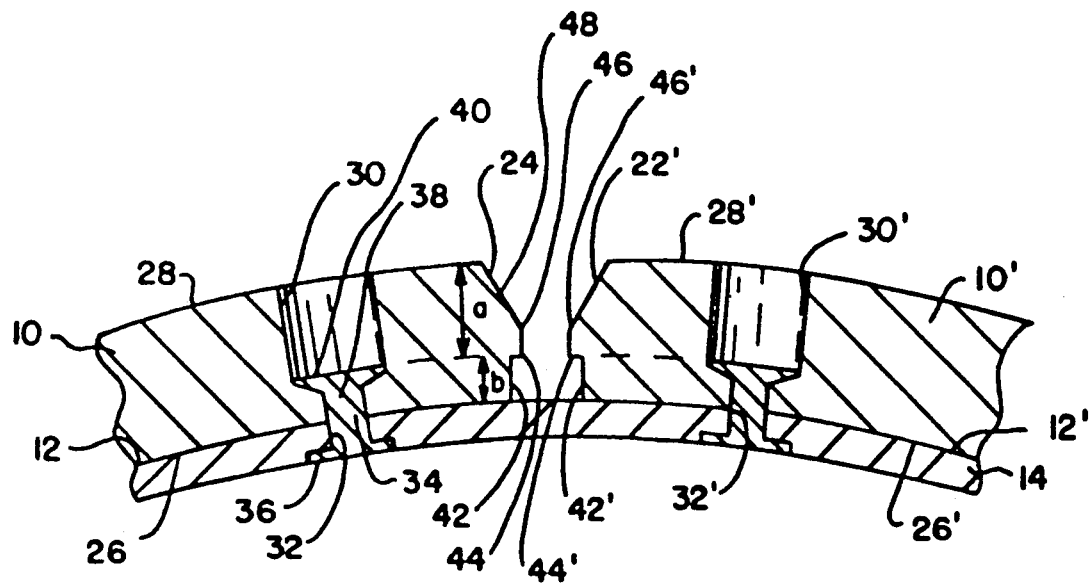
FIG. 3 is a view along line 3—3 of FIG. 2.

The friction material brake blocks (10 and 10') of the present invention may be attached to the top surface (12) of a backing plate (14) by more than one method. In the preferred embodiment of the present invention the brake block (10) is affixed to backing plate (14) by rivets. Turning to FIG. 3, it may be seen that a plurality of stepped bores (30) are formed in brake block (10). These bores are aligned with stepped bores (32) in backing plate (14). A rivet (34) having a head (36) is mounted in the stepped bore (32) of backing plate (14) such that a shank (38) projects upwardly into the stepped bore (30) of brake block (10). A punch, not shown, is driven into stepped bore (32) to peen the end of the shank (38) as shown in FIG. 3 to thereby affix the brake block (10) to the backing plate (14). In addition to the mechanical fasteners utilized for affixing a brake block to a backing plate, an adhesive fastener may be utilized to affix the brake block (10) to the backing plate (14). Using an adhesive to fasten a brake block to a backing plate eliminates the need to bore holes in the brake block or the backing plate. To fasten a brake block to a backing plate utilizing an adhesive involves inserting the adhesive between the arcuate bottom surface (26) of a brake block (10) and the complementary curved top surface (12) of a backing plate (14) and applying an appropriate combination of heat and/or pressure to cause the adhesive to cure.

Turning again to FIG. 3, it may be observed that where a rivet (34) has been utilized to attach the brake block (10) to the backing plate (14), the entire thickness of the brake block (10) is not available to be used for stopping a vehicle. Instead, only that portion of the brake block (10) which extends from the top surface (40) of the rivet (34) to the top surface (28) of the brake block designated (a) is available for use in braking a vehicle. The portion of the brake block (10) between the top surface (40) of the rivet (34) and the arcuate bottom surface (26) of the brake block identified as (b) in the drawing may not be used inasmuch as the rivets (34) project into this area and the rivets would scrape against the inner surface of a brake drum if the brake shoe (16) were permitted to remain on a vehicle after the thickness of the brake block (10) has been reduced below the top surface (40) of the rivets (34).

The visual brake block wear indicator of the present invention provides one or more reference marks on the lateral end surfaces (22 and 24) of the brake block (10) to indicate visually the remaining usable thickness of friction material beneath top surface (28). One reference may be a notch or groove (42) formed in the portion of the brake block between the bottom surface (26) and a point (44) corresponding with the top surface (40) of rivet (34). In other words, so long as the top surface (28) of the brake block (10) is not worn down to the point (44) defined on the end surface (24) the rivets (34) which secure the brake block (10) to the backing plate (14) will not scrape the inner surface of a brake drum. It has been found desirable to define a minimum safe depth point (46) on the end surface (24) by forming a tapered surface (48) on the end surface (24). Good maintenance practices would dictate that the brake shoe (16) should be changed out when the top surface (28) of the brake block (10) has worn down to the minimum safe level defined by point (46).

An operator may view the laterally extending end surface (24) and visually determine the remaining useful thickness of brake block material remaining on the shoe (16). So long as a portion of the tapered surface (48) remains visible, the minimum safe level of brake block material has not been reached. When the tapered surface (48) no longer remains visible an operator knows that the brake block (10) has worn such that the minimum safe level of material no longer remains. The brake block material between the minimum safe level set by reference point (46) and the top of a rivet head indicated by reference level (44) would indicate that the brake block (10) has been worn past a minimum safe level and it must be changed to prevent the rivets from contacting the inside surface of a brake drum.

Figure 4:
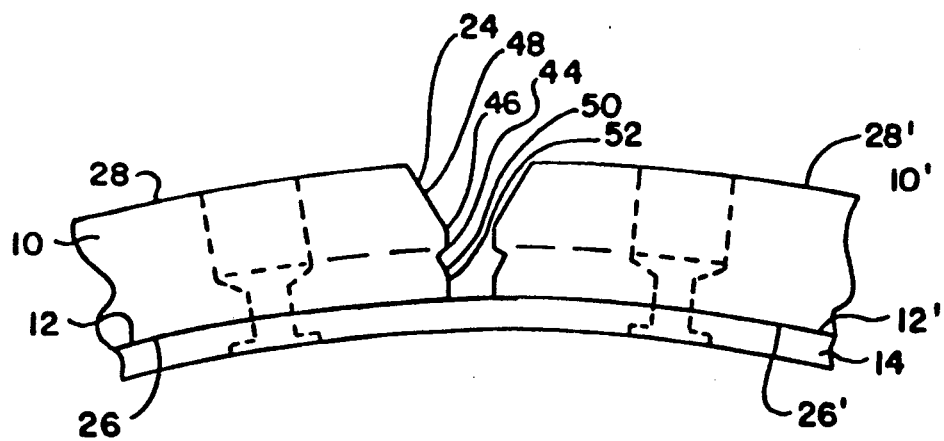
FIG. 4 is a view similar to FIG. 3 with an alternate embodiment of the visible wear indicating means on the ends of a pair of brake blocks.

FIG. 3 depicts a brake block (10) having a visible wear indicator (44)-(48) adapted to be used where rivets affix the brake block to a backing plate. As mentioned above, in some instances the brake block (10) may be affixed to the top surface (12) of a backing plate (14) by an adhesive interposed between the bottom surface (26) of brake block (10) and the top surface (12) of backing plate (14). This assembly constitutes a bonded brake shoe and rivets are not needed. Because a rivet does not project into the body of the brake block (10) to reduce the usable thickness, the brake block of a bonded brake shoe may be worn safely to a lesser remaining thickness (52). Turning to FIG. 4 of the drawings, it may be seen that the visible wear indicator on the end surface (24) of the brake block (10) generally resembles that depicted in FIG. 3. The wear indicator includes points 44 through 48 where the top of a mechanical fastener is referenced at line 44, the minimum safe thickness of brake block (10) is referenced at line (46) and a safe thickness of brake block remains within the tapered surface (48). However, an additional slanted surface (50) is formed on the end surface (24). The slanted surface (50) extends between the line 44 depicting location of a mechanical fastener if one were used to affix the brake block (10) to the backing plate (14) and a line (52) which indicates the minimum safe thickness of brake block material when the brake block (10) has been affixed to backing plate (14) by a bonding process. In other words, a brake block (10) having the wear indicating means (44 through 52) depicted in FIG. 4 may be utilized where either rivets or a bonding process are used to affix the brake block to a backing plate.

Although the indicating means (44 through 52) depicted in FIGS. 2 through 4 preferably are molded integrally into the brake block (10) at the same time the brake block (10) is being manufactured, the wear indicating means (44 through 52) also may be formed by machining one or both end surfaces (22 and 24) of the brake block (10).

Figure 1:
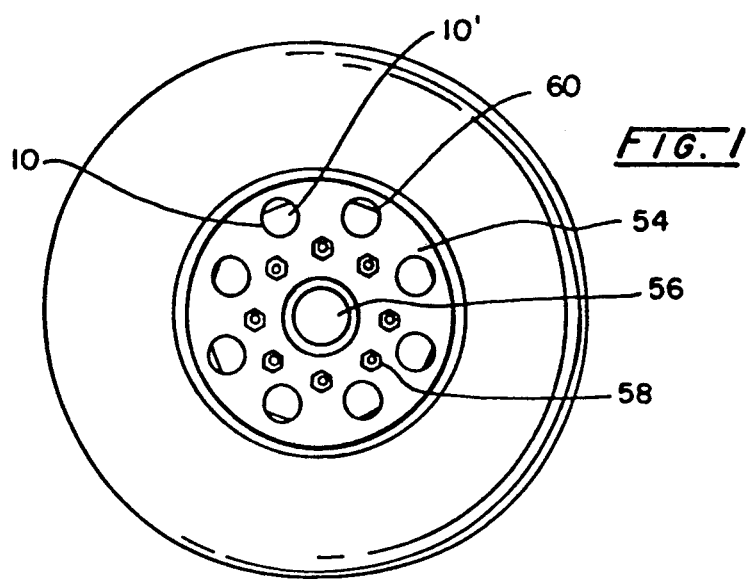
FIG. 1 is a view of the friction material brake block of the present invention illustrated in FIG. 2 shown mounted on a vehicle and visible through an opening in a vehicle wheel.

Turning to FIG. 1 of the drawings, a wheel (54) is shown mounted on the axle (56) of a vehicle, not shown, by a plurality of lug nuts (58) in a well known manner. A plurality of circular openings (60) are formed in wheel (54). These openings coincide with openings in a brake drum, not shown, mounted behind wheel (54). The wheel openings (60) and the openings within the brake drum are aligned with the ends (22 and 24) of the brake blocks (10 and 10'). Consequently, the wear indicating means (44 through 52) formed on the lateral ends of the brake blocks (10 and 10') may be seen by looking through the wheel openings (60) when they rotate to a position in which they are aligned with the brake block ends (22 and 24). In a conventional drum braking system, a pair of brake shoes (16) are mounted within the drum of each wheel. Consequently, the friction material brake block (10 and 10') of each of the plurality of brake shoes (16) may be seen by looking through the wheel opening (60) when they rotate to a position in which the lateral ends (22 and 24) of the friction material brake blocks (10 and 10') become visible.

Since certain changes may be made to the above-described apparatus, system and method without departing from the scope of the invention herein, it is intended that all matter contained in the description thereof or shown in the accompanying drawings shall be interpreted as illustrative and not in a limiting sense.

We claim:

1. A brake block adapted to be enclosed by a brake drum having at least one opening in an automotive drum brake system which comprises: an outside radius forming a top braking surface; and inside radius forming an arcuate bottom surface adapted to be attached to a complementary shaped top surface of a backing plate; said brake block having a range of usable thickness which extends downwardly from said top braking surface a predefined distance; a pair of longitudinally extending side surfaces and a pair of laterally extending end surfaces which define the perimeter of said brake block; visible wear indicating means for directly indicating visibly the remaining usable thickness of said brake block with reference to one of said top braking surface or said bottom surface through said at least one an opening in said brake drum; and wherein said visible wear indicating means is located on one of said laterally extending end surfaces.

2. The friction material brake block of claim 1 in which said visible wear indicating means is molded integrally into said brake block.

3. The friction material brake block of claim 1 in which said visible wear indicating means is machined into said brake block.

4. The friction material brake block of claim 1 in which said visible wear indicating means which comprises a reference which provides a visual indication of the remaining usable thickness of said brake block.

5. The brake block of claim 1 in which said visible wear indicating means comprises a reference which provides a visual indicating of the location of a fastening means used to affix said brake block to said backing plate.

6. The brake block of claim 1 in which said visible wear indicating means comprises a first reference which provides a visual indicating of the remaining usable thickness of said brake block where a fastener is used to fasten said brake block to said backing plate and a second reference which provides a visual indicating of the location of a fastener used to affix said brake block to said backing plate.

7. The brake block of claim 6 in which said visible wear indicating means further comprises a third reference which provides a visual indicating of the remaining usable thickness of said brake block when said brake block is bonded to said backing plate.

* * * * *